United States Patent
Li (10) Patent No.: US 10,394,443 B2
(45) Date of Patent: *Aug. 27, 2019

(54) METHOD FOR VIEWING MESSAGE AND USER TERMINAL

(71) Applicant: Guangdong Oppo Mobile Telecommunications Corp., Ltd., Dongguan, Guangdong (CN)

(72) Inventor: Jianlin Li, Guangdong (CN)

(73) Assignee: Guangdong Oppo Mobile Telecommunications Corp., Ltd., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/197,045

(22) Filed: Nov. 20, 2018

(65) Prior Publication Data

US 2019/0087065 A1    Mar. 21, 2019

Related U.S. Application Data

(63) Continuation of application No. 15/648,109, filed on Jul. 12, 2017, which is a continuation-in-part of
(Continued)

(30) Foreign Application Priority Data

Aug. 27, 2015 (CN) .......................... 2015 1 0543356

(51) Int. Cl.
*G06F 3/0481* (2013.01)
*G06F 3/041* (2006.01)
(Continued)

(52) U.S. Cl.
CPC .......... *G06F 3/0488* (2013.01); *G06F 3/0416* (2013.01); *G06F 3/0481* (2013.01);
(Continued)

(58) Field of Classification Search
CPC ..................................................... G06F 3/0416
(Continued)

(56) References Cited

U.S. PATENT DOCUMENTS

| | | |
|---|---|---|
| 2013/0234959 A1 | 9/2013 | Yoo |
| 2014/0160010 A1 | 6/2014 | Jung et al. |

(Continued)

FOREIGN PATENT DOCUMENTS

| | | |
|---|---|---|
| CN | 102270092 A | 12/2011 |
| CN | 102662573 A | 9/2012 |

(Continued)

OTHER PUBLICATIONS

International search report issued in corresponding international application No. PCT/CN2016108711 dated Aug. 16, 2016.

*Primary Examiner* — Cao H Nguyen
(74) *Attorney, Agent, or Firm* — Young Basile Hanlon & MacFarlane, P.C.

(57) ABSTRACT

A method for viewing a message is provided. The method includes the following. A first touch operation performed on an icon of a message application of the user terminal is detected. At least one touch parameter of the first touch operation is obtained, where the at least one touch parameter includes a first touch pressure value and a first touch duration. Whether the first touch pressure value exceeds a first preset threshold is determined, and whether the first touch duration exceeds a preset duration is determined. At least one message previewing window is output and at least one first target message is displayed in the at least one message previewing window based on a determination that the first touch pressure value exceeds the first preset threshold and the first touch duration exceeds the preset duration. A user terminal is further provided.

20 Claims, 6 Drawing Sheets

Related U.S. Application Data application No. PCT/CN2016/081711, filed on May 11, 2016.

(51) Int. Cl.
*G06F 3/0488* (2013.01)
*G06K 9/00* (2006.01)
*G06F 3/0484* (2013.01)

(52) U.S. Cl.
CPC ........... *G06F 3/04817* (2013.01); *G06K 9/00* (2013.01); *G06K 9/00087* (2013.01); *G06F 3/0414* (2013.01); *G06F 3/04845* (2013.01); *G06F 2203/04105* (2013.01); *G06F 2203/04806* (2013.01)

(58) Field of Classification Search
USPC ......................................... 715/748, 745, 762
See application file for complete search history.

(56) References Cited

U.S. PATENT DOCUMENTS

| | | | | |
|---|---|---|---|---|
| 2014/0267078 | A1* | 9/2014 | Kukulski | G06F 3/0416 345/173 |
| 2015/0296062 | A1* | 10/2015 | Lee | G02F 1/133345 455/566 |
| 2017/0011210 | A1 | 1/2017 | Cheong et al. | |

FOREIGN PATENT DOCUMENTS

| | | |
|---|---|---|
| CN | 103118197 A | 5/2013 |
| CN | 103870190 A | 6/2014 |
| CN | 103914148 A | 7/2014 |
| CN | 104346050 A | 2/2015 |
| CN | 104714741 A | 6/2015 |
| CN | 104777957 A | 7/2015 |
| CN | 104823434 A | 8/2015 |

* cited by examiner

METHOD FOR VIEWING MESSAGE AND USER TERMINAL

CROSS-REFERENCE TO RELATED APPLICATION(S)

This application is a continuation of U.S. application Ser. No. 15/648,109, filed on Jul. 12, 2017, which is a continuation-in-part of PCT Patent Application No. PCT/CN2016/081711, filed on May 11, 2016, which claims priority to Chinese Patent Application No. 201510543356.4, filed on Aug. 27, 2015, the contents of all of which are hereby incorporated by reference in their entireties.

TECHNICAL FIELD

The present disclosure relates to the field of electronic technology, and particularly to a method for viewing a message and a user terminal.

BACKGROUND

With continuous development and popularity of terminals (for example, mobile phones), terminals have become a necessity in daily life. In daily life, people often use mobile phones to make calls, answer calls, receive and reply to short messages, and so on. In actual use, when a user needs to view a short message, a message application needs to be started to display a message list, and then a certain short message of the short list is clicked for viewing content of the short message. When using the above manner to view a message, interface switching needs to be performed for many times, thus the operation process is complicated and time consuming.

SUMMARY

Implementations of the present disclosure provide a method for viewing a message and a user terminal, which can save time for viewing one or more messages.

According to a first aspect, a method for viewing a message is provided. The method may include the follows. A first touch operation performed on an icon of a message application of a user terminal is detected. At least one touch parameter of the first touch operation is obtained, where the at least one touch parameter includes a first touch pressure value and a first touch duration. Whether the first touch pressure value exceeds a first preset threshold is determined, and whether the first touch duration exceeds a preset duration is determined. At least one message previewing window is output and at least one first target message is displayed in the at least one message previewing window, based on a determination that the first touch pressure value exceeds the first preset threshold and the first touch duration exceeds the preset duration. After the displaying at least one first target message in the at least one message previewing window, the method further includes the following. A second touch operation performed on the icon of the message application is detected, where the second touch operation is corresponding to the first touch operation having a duration exceeding a preset operation duration, and the preset duration is less than the preset operation duration. A second touch pressure value of the second touch operation is obtained. Whether the second touch pressure value exceeds a second preset threshold is determined. Switch from the at least one first target message to at least one second target message corresponding to the second touch pressure value, based on a determination that the second touch pressure value exceeds the second preset threshold.

According to a second aspect, a user terminal is also provided.

The user terminal includes a detecting unit, an obtaining unit, a determining unit, an outputting unit, and a switching unit.

The detecting unit is configured to detect a first touch operation performed on an icon of a message application of the user terminal.

The obtaining unit is configured to obtain at least one touch parameter of the first touch operation, where the at least one touch parameter includes a first touch pressure value and a first touch duration.

The determining unit is configured to determine whether the first touch pressure value exceeds a first preset threshold, and to determine whether the first touch duration exceeds a preset duration.

The outputting unit is configured to output at least one message previewing window and to display at least one first target message in the at least one message previewing window, when the determining unit determines that the first touch pressure value exceeds the first preset threshold and the first touch duration exceeds the preset duration.

The detecting unit is further configured to detect a second touch operation performed on the icon of the message application, after the outputting unit displaying the at least one first target message in the at least one message previewing window, where the second touch operation is corresponding to the first touch operation having a duration exceeding a preset operation duration, and the preset duration is less than the preset operation duration.

The obtaining unit is further configured to obtain a second touch pressure value of the second touch operation.

The determining unit is further configured to determine whether the second touch pressure value exceeds a second preset threshold.

The switching unit is configured to switch from the at least one first target message to at least one second target message corresponding to the second touch pressure value, when the determining unit determines that the second touch pressure value exceeds the second preset threshold.

BRIEF DESCRIPTION OF THE DRAWINGS

To better illustrate the technical solution of implementations of the present disclosure, the following descriptions will briefly illustrate the accompanying drawings described in the implementations. Obviously, the following described accompanying drawings are some implementations of the present disclosure. Persons skilled in the art can derive other accompanying drawings according to the described accompanying drawings without creative efforts.

DETAILED DESCRIPTION

The technical solutions of implementations of the present disclosure will be described clearly and completely in combination with the accompanying drawings of the implementations of the present disclosure. Obviously, the described implementations are merely a part of implementations of the present disclosure, and not all of the implementations. All other implementations obtained by those skilled in the art without creative efforts based on the implementations of the present disclosure shall fall within the protection scope of the present disclosure.

Implementations of the present disclosure provide a method for viewing a message and a terminal, which can save time for viewing a message.

The method may include the follows. A first touch operation performed on an icon of a message application is detected. At least one touch parameter of the first touch operation is obtained, and then at least one first target message is displayed when each of the at least one touch parameter of the first touch operation satisfies a corresponding preset condition.

Figure 1A:
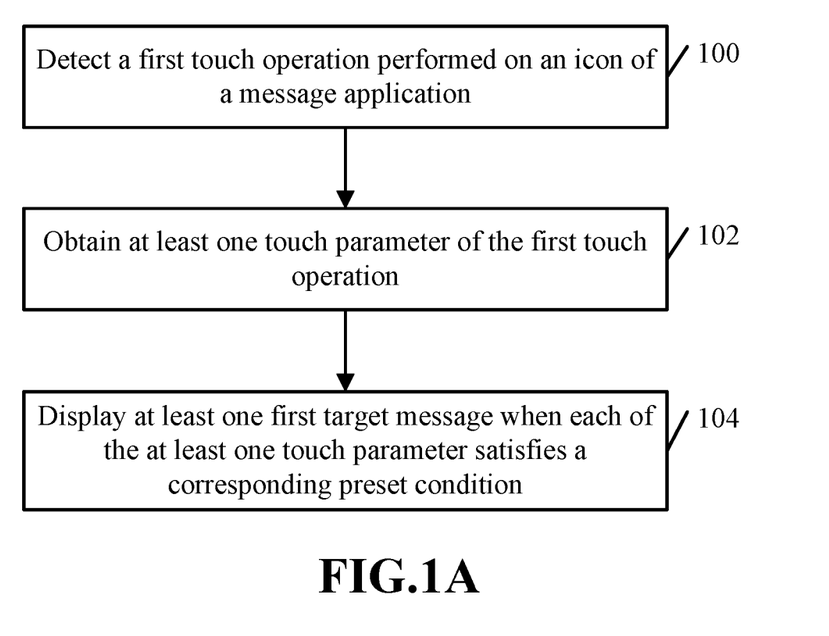
FIG. 1A is a flow chart of a method for viewing a message in accordance with an implementation of the present disclosure.

FIG. 1A is a flow chart of a method for viewing a message in accordance with an implementation of the present disclosure. As illustrated in FIG. 1A, the method begins at block 100.

At block 100, a first touch operation performed on an icon of a message application is detected.

In the implementation, the terminal may be a device having a touch screen or a touch panel arranged thereon, for example, a mobile phone, a tablet computer, a handheld computer, a personal digital assistant (PDA), a smart watch, and so on, and the present disclosure is not limited thereto.

In the implementation, the first touch operation performed on the icon of the message application may be detected in real time, and also the first touch operation performed on the icon of the message application may be detected every a preset interval. The message application may be a system-default message application of the terminal, and also may be a third-party message application installed in the terminal. When the message application is started, a message list recording one or more messages is displayed. The messages may be text messages, image messages, and so on.

In the implementation, the first touch operation may be an operation of pressing the icon of the message application of the terminal, and may be detected based on a change of a capacitance value or resistance value of the touch screen or touch panel.

At block 102, at least one touch parameter of the first touch operation is obtained.

In the implementation, the at least one touch parameter may include a first touch pressure value. The first touch pressure value may be obtained via one or more pressure sensors of the terminal. When more pressure sensors are included, the pressure sensors may be uniformly distributed in a certain region of the terminal or may be uniformly distributed in the terminal.

In at least one alternative implementation, besides the first touch pressure value, the at least one touch parameter may further include at least one of the following: a first touch duration, first touch fingerprint information, first touch position information, a first touch direction, and a first touch trace, and the present disclosure is not limited thereto. Certainly, in other implementations, the first touch pressure value may not be obtained, and the at least one touch parameter may include at least one of the following: the first touch duration, the first touch fingerprint information, the first touch position information, the first touch direction, and the first touch trace.

The first touch position, the first touch direction, and the first touch trace may be determined based on a change of touched coordinate points. The first touch fingerprint information may be obtained via a fingerprint sensor of the terminal. Certainly, touched positions of the touch screen or touch panel, a movement of a finger on the touch screen or touch panel and so on may be determined via one or more photographing devices, or via one or more infrared sensors, or via one or more temperature sensors, and the present disclosure is not limited thereto.

At block 104, at least one first target message is displayed when each of the at least one touch parameter satisfies a corresponding preset condition.

In the implementation, the at least one touch parameter may include the first pressure value. The corresponding preset condition may be that the first touch pressure value is greater than a first preset threshold. That is, when the first touch pressure value is greater than the first preset threshold, one or more first target messages are displayed. The first preset threshold may be a system-default value, and cannot be modified by a user. The first preset threshold may also be a user-defined value, and can be modified according to user actual needs.

In at least one alternative implementation, the at least one touch parameter may include the first touch pressure value and the first touch duration. The corresponding preset condition may be that the first touch pressure value is greater than the first preset threshold and the first touch duration is greater than a preset duration. That is, when the first touch pressure value is greater than the first preset threshold and the first touch duration is greater than the preset duration, one or more first target messages may be displayed. The preset duration may be a system-default value, and also may be a user-defined value. For example, the preset duration may be two seconds, three seconds, and so on. By means of further using the first touch duration, misoperations may be prevented.

In at least one alternative implementation, the at least one touch parameter may include the first touch pressure value and the first touch fingerprint information. The corresponding preset condition may be that the first touch pressure value is greater than the first preset threshold and the first touch fingerprint information matches with preset fingerprint information. That is, when the first touch pressure value is greater than the first preset threshold and the first touch fingerprint information matches with preset fingerprint information, one or more first target messages are displayed. When a matching degree between the first touch fingerprint information and the preset fingerprint information is greater than or equal to a preset threshold, it is determined that the first touch fingerprint information matches with the preset fingerprint information. By means of verifying the first touch fingerprint information, illegal message viewing may be prevented.

In at least one alternative implementation, the at least one touch parameter may include the first touch pressure value, the first touch duration, and the first touch fingerprint information. The corresponding preset condition may be that the first touch pressure value is greater than the first preset threshold, the first touch duration is greater than the preset duration, and the first touch fingerprint information matches with the preset fingerprint information. That is, when the first touch pressure value is greater than the first preset threshold, the first touch duration is greater than the preset duration, and the first touch fingerprint information matches with the preset fingerprint information, one or more first target messages are displayed.

In at least one alternative implementation, one or more message previewing windows may be output to display the one or more first target messages. One message previewing window may be used to display one first target message, and one message previewing window may also be used to display two or more first target messages. When more message previewing windows are displayed, the message previewing windows may be displayed in a preset display mode. For example, when two message previewing windows are displayed, one may be displayed on the top of the screen of the terminal, and the other may be displayed on the bottom of the screen of the terminal, or one may be displayed in a greater size, and the other may be displayed in a smaller size. When more messages are displayed in one message previewing window, the messages may be displayed in a preset display mode. For example, when two messages are displayed in one message previewing window, one message may be displayed on the top of the message previewing window, and the other may be displayed on the bottom of the message previewing window.

In at least one alternative implementation, two or more first target messages may be displayed. The first target messages may be messages from a designated contact person, for example, a family member, and also may be messages received within a designated period, for example, from 8:00 am to 12:00 am, and the present disclosure is not limited thereto.

In at least one alternative implementation, one first target message may be displayed. The first target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative implementation, when one first target message is displayed, after the finger leaves the touch panel or the touch screen, the message previewing window for displaying the first target message may be displayed in a full-screen mode.

For the method illustrated in FIG. 1A, one or more first target messages are displayed when each first touch parameter of the first touch operation satisfies the corresponding preset condition. That is, one or more messages can be directly displayed for viewing when the icon of the message application is touched, which saves time of viewing one or more messages.

In at least one alternative implementation, the method may further include the follows. A second touch operation is detected after displaying the one or more first target messages, and at least one touch parameter of the second touch operation is obtained. At least one second target message corresponding to the second touch operation is determined based on a corresponding relationship between the at least one touch parameter of the second touch operation and at least one second target message, and then the terminal switches to display the at least one second target message corresponding to the second touch operation. That is, one or more second target messages are displayed. Therefore, switching the display of different messages is convenient and time-saving.

In at least one alternative implementation, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the second touch operation is performed, and one or more second target messages are displayed. In other implementations, after one or more first target messages are displayed, the finger of the user leaves the touch screen or the touch panel, and then the user touches the icon of the message application or the message previewing window to perform the second touch operation.

In the implementation, the at least one touch parameter of the second touch operation may include a second touch pressure value. The corresponding relationship between the at least one touch parameter of the second touch operation and at least one second target message may be preset in advance. That is, when the second touch pressure value is obtained, the corresponding relationship is queried to determine one or more second target messages corresponding to the second pressure value, i.e. corresponding to the second touch operation. Different second pressure values may correspond to the same second target message, or may correspond to different second target messages.

In at least one alternative implementation, besides the second touch pressure value, the at least one touch parameter of the second touch operation may further include at least one of the following: a second touch duration, a second fingerprint information, a second touch position information, a second touch direction, and a second touch trace. Certainly, in other implementations, the second touch pressure value may not be obtained, and the at least one touch parameter of the second touch operation may include at least one of the following: the second touch duration, the second fingerprint information, the second touch position information, the second touch direction, and the second touch trace.

In at least one alternative implementation, the method may further include the follows. A third touch operation is detected after displaying the first target message, and at least one touch parameter of the third touch operation is obtained. A display mode corresponding to the third touch operation is determined based on a corresponding relationship between the at least one touch parameter of the third touch operation and at least one display mode each for displaying at least one message, and then the at least one first target message is displayed in the determined display mode.

In at least one alternative implementation, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the third touch operation is performed, a display mode for displaying the one or more first target messages is determined, and then the one or more first target messages are displayed in the determined display mode. In other implementations, after one or more first target messages are displayed, the finger of the user leaves the touch screen or the touch panel, and then the user touches the icon of the message application or the message previewing window to perform the third touch operation.

In the implementation, the at least one touch parameter of the third touch operation may include a third touch pressure value. The corresponding relationship between the at least one touch parameter of the third touch operation and at least one display mode each for displaying at least one message may be preset in advance. That is, when the third touch pressure value is obtained, the corresponding relationship is queried to determine a display mode corresponding to the third touch pressure value, i.e. corresponding to the third touch operation.

The determined display mode may include a scaling factor of the one or more message previewing windows, and a scaling factor of content of the one or more first target messages. That is, when the message previewing window is zoomed in or zoomed out, the content displayed in the message previewing window is accordingly zoomed in or zoomed out, so that it is convenient and comfortable for the user to read the content.

In at least one alternative implementation, besides the third touch pressure value, the at least one touch parameter of the third touch operation may further include at least one of the following: a third touch duration, a third fingerprint information, a third touch position information, a third touch direction, and a third touch trace. Certainly, in other implementations, the third touch pressure value may not be obtained, and the at least one touch parameter of the third touch operation may include at least one of the following: the third touch duration, the third fingerprint information, the third touch position information, the third touch direction, and the third touch trace.

In at least one alternative implementation, according to one or more touch parameters of a touch operation, deleting a message, editing a message, forwarding a message, and so on may also be executed, and the present disclosure is not limited thereto.

Figure 1B:
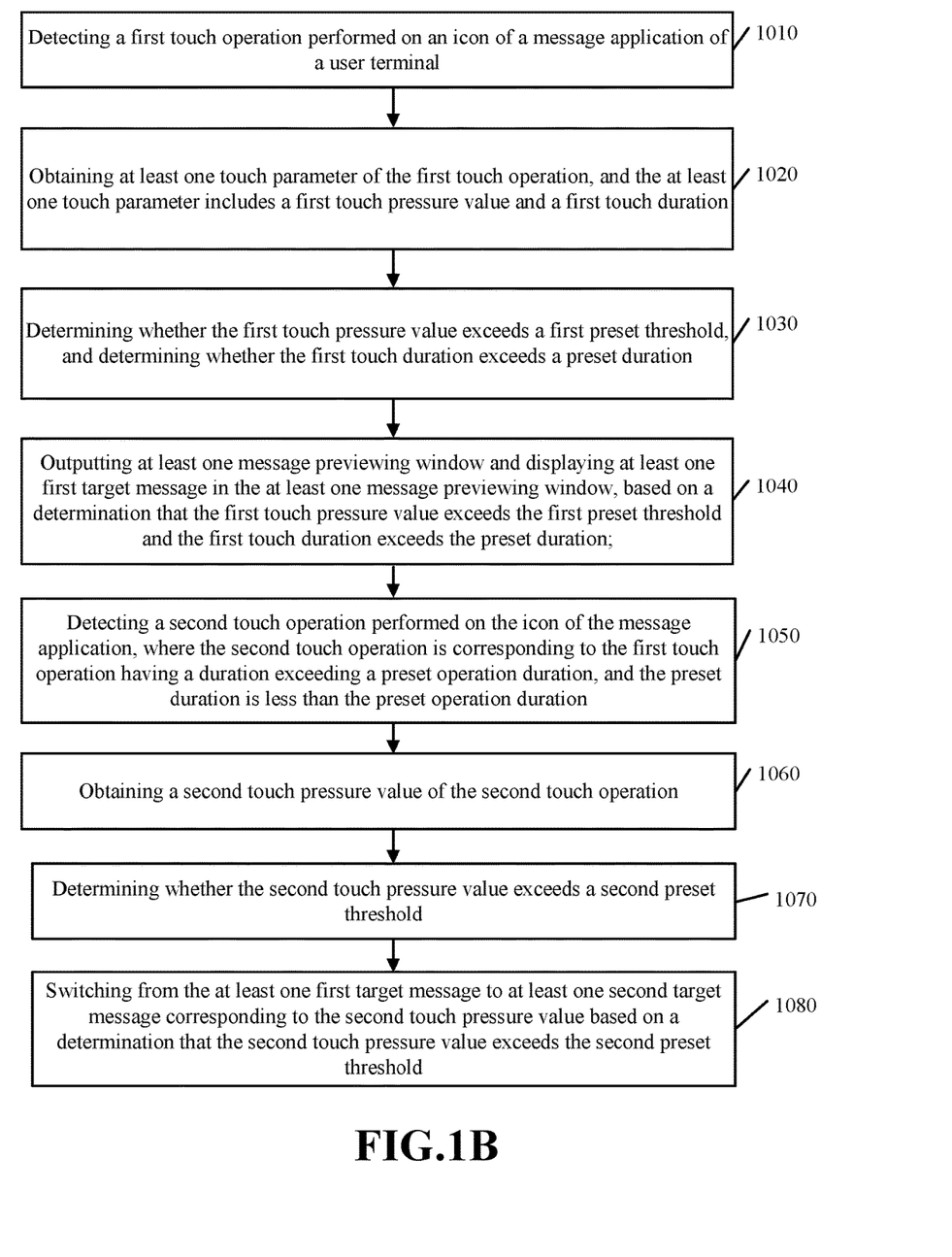
FIG. 1B is a flow chart of a method for viewing a message in accordance with another implementation of the present disclosure.

FIG. 1B is a flow chart of a method for viewing a message in accordance with another implementation of the present disclosure. As illustrated in FIG. 1B, the method begins at block 1010.

At block 1010, a first touch operation performed on an icon of a message application of a user terminal is detected.

At block 1020, at least one touch parameter of the first touch operation is obtained, where the at least one touch parameter includes a first touch pressure value and a first touch duration.

At block 1030, whether the first touch pressure value exceeds a first preset threshold is determined, and whether the first touch duration exceeds a preset duration is determined.

At block 1040, at least one message previewing window is output and at least one first target message is displayed in the at least one message previewing window, based on a determination that the first touch pressure value exceeds the first preset threshold and the first touch duration exceeds the preset duration.

After the displaying at least one first target message in the at least one message previewing window, the method further includes the following.

At block 1050, a second touch operation performed on the icon of the message application is detected, where the second touch operation is corresponding to the first touch operation having a duration exceeding a preset operation duration, and the preset duration is less than the preset operation duration.

At block 1060, a second touch pressure value of the second touch operation is obtained.

At block 1070, whether the second touch pressure value exceeds a second preset threshold is determined.

At block 1080, switch from the at least one first target message to at least one second target message corresponding to the second touch pressure value, based on a determination that the second touch pressure value exceeds the second preset threshold.

In at least one alternative implementation, the at least one touch parameter further includes first touch fingerprint information, and the outputting at least one message previewing window and displaying at least one first target message in the at least one message previewing window may include the following. Whether the first touch fingerprint information matches with preset fingerprint information is determined. The at least one message previewing window is output and the at least one first target message is displayed in the at least one message previewing window, based on a determination that the first touch fingerprint information matches with the preset fingerprint information.

In at least one alternative implementation, after the displaying at least one first target message in the at least one message previewing window, the method may further include the following. A third touch operation performed on the icon of the message application is detected. A third touch pressure value of the third touch operation is obtained. Whether the third touch pressure value exceeds a third preset threshold is determined. A size of the at least one message previewing window is adjusted to be a preset size corresponding to the third touch pressure value, based on a determination that the third touch pressure value exceeds the third preset threshold.

In at least one alternative implementation, the method further includes the following. Content contained in the at least one first target message is scaled according to a target ratio, where the target ratio is a ratio of the preset size of the at least one message previewing window after adjustment to the size of the at least one message previewing window before adjustment.

Figure 2:
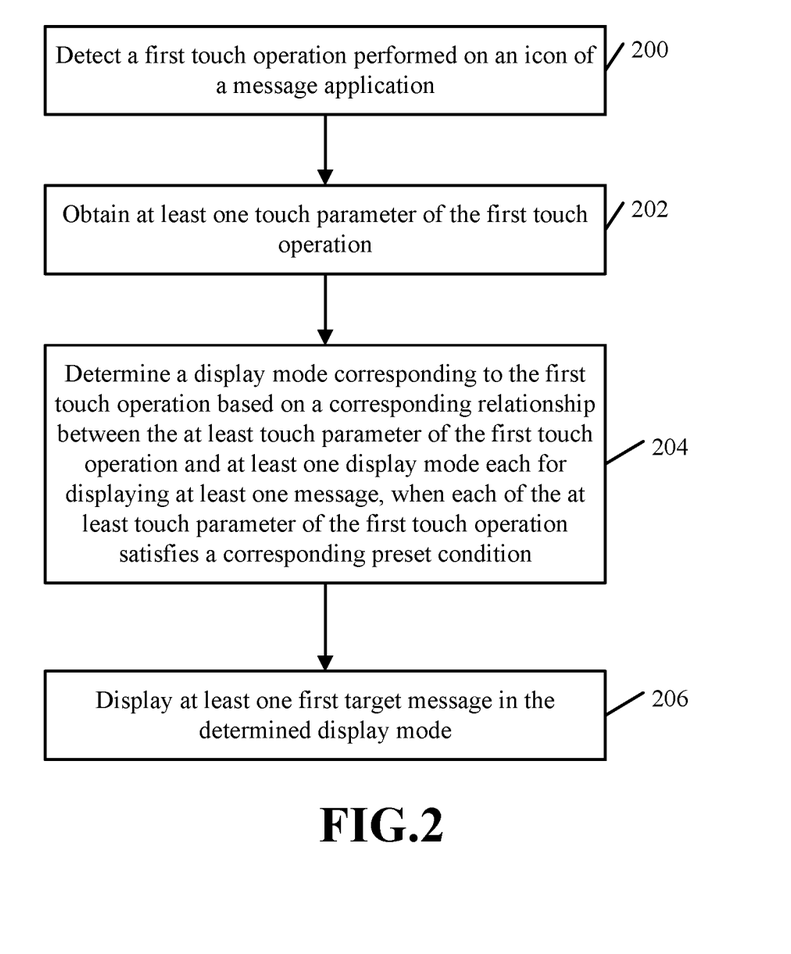
FIG. 2 is a flow chart of a method for viewing a message in accordance with still another implementation of the present disclosure.

FIG. 2 is a flow chart of a method for viewing a message in accordance with still another implementation of the present disclosure. As illustrated in FIG. 2, the method begins at block 200.

At block 200, a first touch operation performed on an icon of a message application is detected. The operation at block 200 may correspond to the operation at block 100.

At block 202, at least one touch parameter of the first touch operation is obtained. The operation at block 202 may correspond to the operation at block 102.

At block 204, a display mode corresponding to the first touch operation is determined based on a corresponding relationship between the at least touch parameter of the first touch operation and at least one display mode each for displaying at least one message, when each of the at least touch parameter of the first touch operation satisfies a corresponding preset condition.

At block 206, at least one first target message is displayed in the determined display mode.

In at least one alternative implementation, illustrations of the corresponding preset condition may be substantially the same as that illustrated in FIG. 1A, which will not be repeated herein.

In at least one alternative implementation, one or more message previewing windows may be output to display the one or more first target messages. One message previewing window may be used to display one first target message, and one message previewing window may also be used to display two or more first target messages.

In at least one alternative implementation, two or more first target messages may be displayed. The first target messages may be messages from a designated contact person, for example, a family member, and also may be messages received within a designated period, for example, from 8:00 am to 12:00 am, and the present disclosure is not limited thereto.

In at least one alternative implementation, one first target message may be displayed. The first target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative implementation, the corresponding relationship between the at least one touch parameter of the first touch operation and at least one display mode each for displaying at least one message may be preset in advance. The determined display mode may include a scaling factor of each message previewing window, and a scaling factor of content of each first target message. When more message previewing windows are output, the determined display mode may also include an arrangement manner of the message previewing windows. For example, when two message previewing windows are displayed, one may be displayed on the top of the screen of the terminal, and the other may be displayed on the bottom of the screen of the terminal, or one may be displayed in a greater size, and the other may be displayed in a smaller size. When two or more first target messages are displayed in one message previewing window, the determined display mode may include an arrangement manner of the first target messages in one message previewing window. For example, when two first target messages are displayed in one message previewing window, one may be displayed on the top of the message previewing window, and the other may be displayed on the bottom of the message previewing window.

For the method illustrated in FIG. 2, when each touch parameter of the first touch operation satisfies its corresponding preset condition, a display mode for displaying at least one message is determined, and then one or more first target messages are displayed in the determined display mode. Therefore, it is convenient for a user to view one or more messages in a suitable manner by performing a touch operation on the icon of the message application.

Figure 3A:
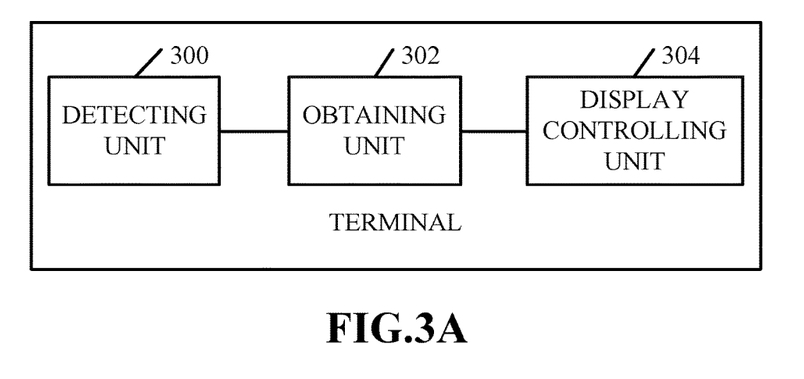
FIG. 3A is a structure diagram of a terminal in accordance with an implementation of the present disclosure.

FIG. 3A is a structure diagram of a terminal in accordance with an implementation of the present disclosure. The terminal illustrated in FIG. 3A may include a detecting unit 300, an obtaining unit 302, and a display controlling unit 304.

The detecting unit 300 may be configured to detect a first touch operation performed on an icon of a message application.

In the implementation, the terminal may be a device having a touch screen or a touch panel arranged thereon, for example, a mobile phone, a tablet computer, a handheld computer, a personal digital assistant (PDA), a smart watch, and so on, and the present disclosure is not limited thereto.

In the implementation, the first touch operation performed on the icon of the message application may be detected in real time, and also the first touch operation performed on the icon of the message application may be detected every a preset interval. The message application may be a system-default message application of the terminal, and also may be a third-party message application installed in the terminal. When the message application is started, a message list recording one or more messages is displayed. The messages may be text messages, image messages, and so on.

In the implementation, the first touch operation may be an operation of pressing the icon of the message application of the terminal, and may be detected based on a change of a capacitance value or resistance value of the touch screen or touch panel.

The obtaining unit 302 may be configured to obtain at least one touch parameter of the first touch operation.

In the implementation, the at least one touch parameter may include a first touch pressure value. The first touch pressure value may be obtained via one or more pressure sensors of the terminal. When more pressure sensors are included, the pressure sensors may be uniformly distributed in a certain region of the terminal or may be uniformly distributed in the terminal.

In at least one alternative implementation, besides the first touch pressure value, the at least one touch parameter may further include at least one of the following: a first touch duration, first touch fingerprint information, first touch position information, a first touch direction, and a first touch trace, and the present disclosure is not limited thereto. Certainly, in other implementations, the first touch pressure value may not be obtained, and the at least one touch parameter may include at least one of the following: the first touch duration, the first touch fingerprint information, the first touch position information, the first touch direction, and the first touch trace.

The first touch position, the first touch direction, and the first touch trace may be determined based on a change of touched coordinate points. The first touch fingerprint information may be obtained via a fingerprint sensor of the terminal. Certainly, touched positions of the touch screen or touch panel, a movement of a finger on the touch screen or touch panel and so on may be determined via one or more photographing devices, or via one or more infrared sensors, or via one or more temperature sensors, and the present disclosure is not limited thereto.

The display controlling unit 304 may be configured to display at least one first target message when each of the at least one touch parameter satisfies a corresponding preset condition.

In the implementation, the at least one touch parameter may include the first pressure value. The corresponding preset condition may be that the first touch pressure value is greater than a first preset threshold. That is, when the first touch pressure value is greater than the first preset threshold, one or more first target messages are displayed. The first preset threshold may be a system-default value, and cannot be modified by a user. The first preset threshold may also be a user-defined value, and can be modified according to user actual needs.

In at least one alternative implementation, the at least one touch parameter may include the first touch pressure value and the first touch duration. The corresponding preset condition may be that the first touch pressure value is greater than the first preset threshold and the first touch duration is greater than a preset duration. That is, when the first touch pressure value is greater than the first preset threshold and the first touch duration is greater than the preset duration, one or more first target messages may be displayed. The preset duration may be a system-default value, and also may be a user-defined value. For example, the preset duration may be two seconds, three seconds, and so on. By means of further using the first touch duration, misoperations may be prevented.

In at least one alternative implementation, the at least one touch parameter may include the first touch pressure value and the first touch fingerprint information. The corresponding preset condition may be that the first touch pressure value is greater than the first preset threshold and the first touch fingerprint information matches with preset fingerprint information. That is, when the first touch pressure value is greater than the first preset threshold and the first touch fingerprint information matches with preset fingerprint information, one or more first target messages are displayed. When a matching degree between the first touch fingerprint information and the preset fingerprint information is greater than or equal to a preset threshold, it is determined that the first touch fingerprint information matches with the preset fingerprint information. By means of verifying the first touch fingerprint information, illegal message viewing may be prevented.

In at least one alternative implementation, the at least one touch parameter may include the first touch pressure value, the first touch duration, and the first touch fingerprint information. The corresponding preset condition may be that the first touch pressure value is greater than the first preset threshold, the first touch duration is greater than the preset duration, and the first touch fingerprint information matches with the preset fingerprint information. That is, when the first touch pressure value is greater than the first preset threshold, the first touch duration is greater than the preset duration, and the first touch fingerprint information matches with the preset fingerprint information, one or more first target messages are displayed.

In at least one alternative implementation, one or more message previewing windows may be output to display the one or more first target messages. One message previewing window may be used to display one first target message, and one message previewing window may also be used to display two or more first target messages. When more message previewing windows are displayed, the message previewing windows may be displayed in a preset display mode. For example, when two message previewing windows are displayed, one may be displayed on the top of the screen of the terminal, and the other may be displayed on the bottom of the screen of the terminal, or one may be displayed in a greater size, and the other may be displayed in a smaller size. When more messages are displayed in one message previewing window, the messages may be displayed in a preset display mode. For example, when two messages are displayed in one message previewing window, one message may be displayed on the top of the message previewing window, and the other may be displayed on the bottom of the message previewing window.

In at least one alternative implementation, two or more first target messages may be displayed. The first target messages may be messages from a designated contact person, for example, a family member, and also may be messages received within a designated period, for example, from 8:00 am to 12:00 am, and the present disclosure is not limited thereto.

In at least one alternative implementation, one first target message may be displayed. The first target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative implementation, when one first target message is displayed, after the finger leaves the touch panel or the touch screen, the message previewing window for displaying the first target message may be displayed in a full-screen mode.

For the terminal illustrated in FIG. 3A, one or more first target messages are displayed when each first touch parameter of the first touch operation satisfies the corresponding preset condition. That is, one or more messages can be directly displayed for viewing when the icon of the message application is touched, which saves time of viewing one or more messages.

In at least one alternative implementation, the detecting unit 300 may be further configured to detect a second touch operation after displaying the one or more first target messages. The obtaining unit 302 may be further configured to obtain at least one touch parameter of the second touch operation. The display controlling unit 304 may be further configured to determine at least one second target message corresponding to the second touch operation based on a corresponding relationship between the at least one touch parameter of the second touch operation and at least one second target message, and switch to display the at least one second target message corresponding to the second touch operation. That is, one or more second target messages are displayed. Therefore, switching the display of different messages is convenient and time-saving.

In at least one alternative implementation, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the second touch operation is performed, and one or more second target messages are displayed. In other implementations, after one or more first target messages are displayed, the finger of the user leaves the touch screen or the touch panel, and then the user touches the icon of the message application or the message previewing window to perform the second touch operation.

In the implementation, the at least one touch parameter of the second touch operation may include a second touch pressure value. The corresponding relationship between the at least one touch parameter of the second touch operation and at least one second target message may be preset in advance. That is, when the second touch pressure value is obtained, the corresponding relationship is queried to determine one or more second target messages corresponding to the second pressure value, i.e. corresponding to the second touch operation. Different second pressure values may correspond to the same second target message, or may correspond to different second target messages.

In at least one alternative implementation, besides the second touch pressure value, the at least one touch parameter of the second touch operation may further include at least one of the following: a second touch duration, a second fingerprint information, a second touch position information, a second touch direction, and a second touch trace. Certainly, in other implementations, the second touch pressure value may not be obtained, and the at least one touch parameter of the second touch operation may include at least one of the following: the second touch duration, the second fingerprint information, the second touch position information, the second touch direction, and the second touch trace.

In at least one alternative implementation, the detecting unit 300 may be further configured to detect a third touch operation after displaying the first target message. The obtaining unit 302 may be further configured to obtain at least one touch parameter of the third touch operation. The display controlling unit 304 may be further configured to determine a display mode corresponding to the third touch operation based on a corresponding relationship between the at least one touch parameter of the third touch operation and at least one display mode each for displaying at least one message, and display the at least one first target message in the determined display mode.

In at least one alternative implementation, when a duration of a touch operation performed on the icon of the message application is greater than a preset duration, it is determined that the first touch operation is performed, and one or more first target messages are displayed. If the user continues to touch the icon of the message application without leaving the icon of the message application after the one or more first target messages are displayed, it is determined that the third touch operation is performed, a display mode for displaying the one or more first target messages is determined, and then the one or more first target messages are displayed in the display mode. In other implementations, after one or more first target messages are displayed, the finger of the user leaves the touch screen or the touch panel, and then the user touches the icon of the message application or the message previewing window to perform the third touch operation.

In the implementation, the at least one touch parameter of the third touch operation may include a third touch pressure value. The corresponding relationship between the at least one touch parameter of the third touch operation and at least one display mode each for displaying a message may be preset in advance. That is, when the third touch pressure value is obtained, the corresponding relationship is queried to determine a display mode corresponding to the third touch pressure value, i.e. corresponding to the third touch operation.

The determined display mode may include a scaling factor of the one or more message previewing windows, and a scaling factor of content of the one or more first target messages. That is, when the message previewing window is zoomed in or zoomed out, the content displayed in the message previewing window is accordingly zoomed in or zoomed out, so that it is convenient and comfortable for the user to read the content.

In at least one alternative implementation, besides the third touch pressure value, the at least one touch parameter of the third touch operation may further include at least one of the following: a third touch duration, a third fingerprint information, a third touch position information, a third touch direction, and a third touch trace. Certainly, in other implementations, the third touch pressure value may not be obtained, and the at least one touch parameter of the third touch operation may include at least one of the following: the third touch duration, the third fingerprint information, the third touch position information, the third touch direction, and the third touch trace.

In at least one alternative implementation, according to one or more touch parameters of a touch operation, deleting a message, editing a message, forwarding a message, and so on may also be executed, and the present disclosure is not limited thereto.

Figure 3B:
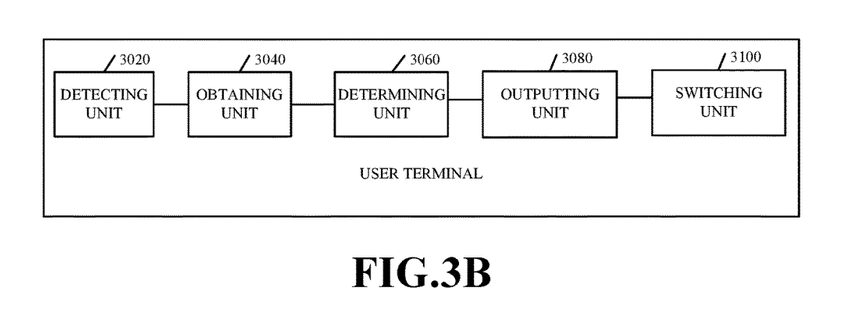
FIG. 3B is a structure diagram of a user terminal in accordance with another implementation of the present disclosure.

FIG. 3B is a structure diagram of a user terminal in accordance with another implementation of the present disclosure. The user terminal (or can be referred as a terminal) illustrated in FIG. 3B may include a detecting unit 3020, an obtaining unit 3040, a determining unit 3060, an outputting unit 3080, and a switching unit 3100.

The detecting unit 3020 is configured to detect a first touch operation performed on an icon of a message application of the user terminal.

The obtaining unit 3040 is configured to obtain at least one touch parameter of the first touch operation, where the at least one touch parameter includes a first touch pressure value and a first touch duration.

The determining unit 3060 is configured to determine whether the first touch pressure value exceeds a first preset threshold, and to determine whether the first touch duration exceeds a preset duration.

The outputting unit 3080 is configured to output at least one message previewing window and to display at least one first target message in the at least one message previewing window, when the determining unit 3060 determines that the first touch pressure value exceeds the first preset threshold and the first touch duration exceeds the preset duration.

The detecting unit 3020 is further configured to detect a second touch operation performed on the icon of the message application, after the outputting unit 3080 displaying the at least one first target message in the at least one message previewing window, where the second touch operation is corresponding to the first touch operation having a duration exceeding a preset operation duration, and the preset duration is less than the preset operation duration.

The obtaining unit 3040 is further configured to obtain a second touch pressure value of the second touch operation.

The determining unit 3060 is further configured to determine whether the second touch pressure value exceeds a second preset threshold.

The switching unit 3100 is configured to switch from the at least one first target message to at least one second target message corresponding to the second touch pressure value, when the determining unit 3060 determines that the second touch pressure value exceeds the second preset threshold.

In at least one alternative implementation, the at least one touch parameter further includes first touch fingerprint information, and the determining unit 3060 is further configured to determine whether the first touch fingerprint information matches with preset fingerprint information, and to trigger the outputting unit 3080 to output the at least one message previewing window and to display the at least one first target message in the at least one message previewing window, when the determining unit 3060 determines that the first touch fingerprint information matches with the preset fingerprint information.

Figure 3C:
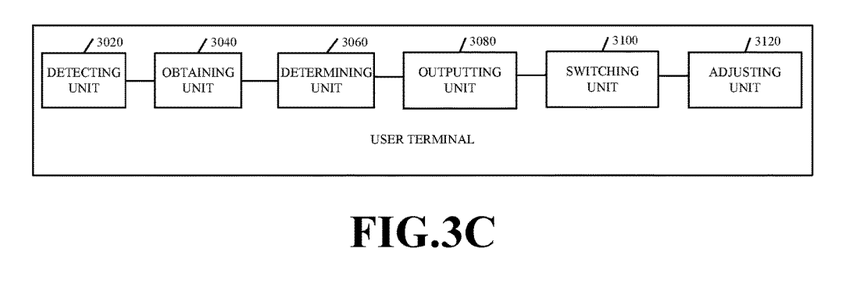
FIG. 3C is a structure diagram of a user terminal in accordance with still another implementation of the present disclosure.

In at least one alternative implementation, the detecting unit 3020 is further configured to detect a third touch operation performed on the icon of the message application, after the outputting unit 3080 displaying the at least one first target message in the at least one message previewing window. The obtaining unit 3040 is further configured to obtain a third touch pressure value of the third touch operation. The determining unit 3060 is further configured to determine whether the third touch pressure value exceeds a third preset threshold. The user terminal further includes an adjusting unit 3120 illustrated in FIG. 3C. The adjusting unit 3120 is configured to adjust a size of the at least one message previewing window to be a preset size corresponding to the third touch pressure value, when the determining unit 3060 determines that the third touch pressure value exceeds the third preset threshold.

Figure 3D:
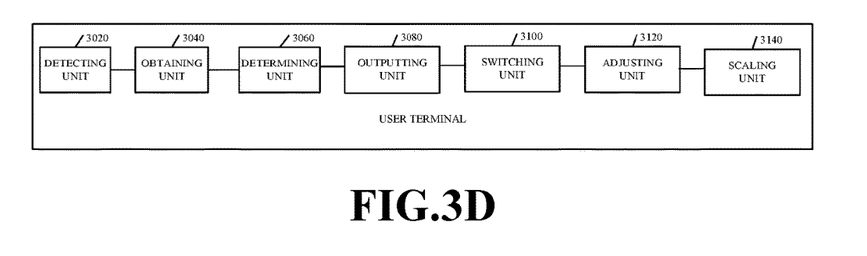
FIG. 3D is a structure diagram of a user terminal in accordance with still another implementation of the present disclosure.

In at least one alternative implementation, the user terminal further includes a scaling unit 3140 illustrated in FIG. 3D. The scaling unit 3140 is configured to scale content contained in the at least one first target message according to a target ratio, where the target ratio is a ratio of the preset size of the at least one message previewing window after adjustment to the size of the at least one message previewing window before adjustment.

Figure 4:
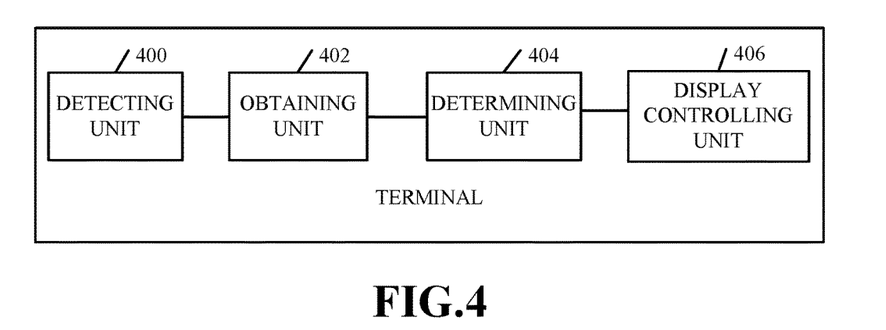
FIG. 4 is a structure diagram of a terminal in accordance with still another implementation of the present disclosure.

FIG. 4 is a structure diagram of a terminal in accordance with still another implementation of the present disclosure. The terminal illustrated in FIG. 4 may include a detecting unit 400, an obtaining unit 402, a determining unit 404, and a display controlling unit 406.

The detecting unit 400 may be substantially the same as the detecting unit 300, and may be configured to detect a touch operation performed on an icon of a message application.

The obtaining unit 402 may be substantially the same as the obtaining unit 302, and may be configured to obtain at least one touch parameter of the touch operation.

The determining unit 404 may be configured to determine a display mode corresponding to the touch operation based on a corresponding relationship between the at least touch parameter of the touch operation and at least one display mode each for displaying at least one message, when each of the at least touch parameter of the first touch operation satisfies a corresponding preset condition.

The display controlling unit 406 may be configured to display at least one target message in the determined display mode.

In at least one alternative implementation, illustrations of the corresponding preset condition may be substantially the same as that illustrated in FIG. 3A, which will not be repeated herein.

In at least one alternative implementation, one or more message previewing windows may be output to display the one or more target messages. One message previewing window may be used to display one target message, and one message previewing window may also be used to display two or more target messages.

In at least one alternative implementation, two or more target messages may be displayed. The target messages may be messages from a designated contact person, for example, a family member, and also may be messages received within a designated period, for example, from 8:00 am to 12:00 am, and the present disclosure is not limited thereto.

In at least one alternative implementation, one target message may be displayed. The target message may be a message the time of receiving which is most adjacent to the current system time (for example, the message displayed on the top of the message list, also may be a designated message (for example, a weather forecast message), and also may be a message the time of receiving which is most away from the current system time (for example, the message displayed on the bottom of the message list), and the present disclosure is not limited thereto.

In at least one alternative implementation, the corresponding relationship between the at least one touch parameter of the touch operation and at least one display mode each for displaying at least one message may be preset in advance. The determined display mode may include a scaling factor of each message previewing window, and a scaling factor of content of each target message. When more message previewing windows are output, the determined display mode may also include an arrangement manner of the message previewing windows. For example, when two message previewing windows are displayed, one may be displayed on the top of the screen of the terminal, and the other may be displayed on the bottom of the screen of the terminal, or one may be displayed in a greater size, and the other may be displayed in a smaller size. When two or more messages are displayed in one message previewing window, the determined display mode may include an arrangement manner of the target messages in one message previewing window. For example, when two messages are displayed in one message previewing window, one may be displayed on the top of the message previewing window, and the other may be displayed on the bottom of the message previewing window.

For the terminal illustrated in FIG. 4, when each touch parameter of the first touch operation satisfies its corresponding preset condition, a display mode for displaying at least one message is determined, and then one or more target messages are displayed in the determined display mode. Therefore, it is convenient for a user to view one or more messages in a suitable manner by performing a touch operation on the icon of the message application.

It shall be noted that the terminal described in the device implementation of the present disclosure is illustrated in the form of functional units. The term "unit" used herein shall be taken in the broadest possible sense. Objects for realizing the function of each unit can be an application specific integrated circuit (ASIC), a single circuit, a processor (shared, specific, or chipset) for executing one or more software or hardware procedures, a memory, a combined logic circuit, and/or other appropriate assembly for realizing the above function.

Figure 5:
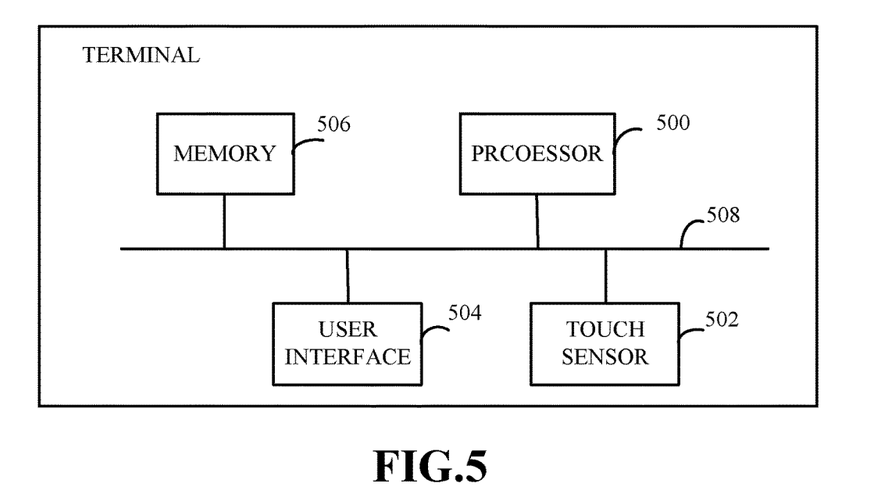
FIG. 5 is a structure diagram of a terminal in accordance with an implementation of the present disclosure.

FIG. 5 is a structure diagram of a terminal in accordance with an implementation of the present disclosure, and the terminal is configured to execute the method for viewing a message. As illustrated in FIG. 5, the terminal may include at least one processor 500, at least one touch sensor 502, at least one user interface 504, a memory 506 and other components. These components are coupled and communicate with each other via one or more buses 508. A person skilled in the art shall understand that the structure of the terminal illustrated in FIG. 5 is not limit the implementation of the present disclosure. The structure can be a bus structure, can also be a star structure, and can include more or less components, or some components can be combined, or components can be arranged in a different way.

The processor 500 is a control center of the terminal, and is coupled to various components of the terminal via various interfaces and lines. The processor 500 runs or executes program codes and/or modules of the memory 506 and invokes data of the memory 506 to execute various functions and data processing of the terminal. The processor 500 may be formed by an integrated circuit (IC), for example, may be formed by a single packaged IC, and also may be formed by coupling multiple ICs having the same function or different functions. For example, the processor 500 may only include a central processing unit (CPU), and also may be a combination of the CPU, a digital signal processor (DSP), a graphic processing unit (GPU), and various control chips. In the implementation of the present disclosure, the CPU may be a single computing core, and can also include a multiple computing core.

The at least one touch sensor 502 may include but is not limited to a pressure sensor, a photographing device, a fingerprint sensor, an infrared sensor, a temperature sensor, and so on, and may be configured to collect one or more touch parameters of a touch operation performed on an icon of a message application.

The at least one user interface 504 may include a touch screen and/or a touch panel for operating the terminal via touch operations.

The memory 506 may store soft programs and modules. The processor 500 invokes the soft programs and modules stored in the memory 506 to execute various functions and data processing of the terminal. The memory 506 may include a program storing region and a data storing region. The program storing region may store an operating system, computer-readable program codes for at least one function, and so on. The data storing region may store data created according to use of the user terminal. In the implementation, the operating system may be an Android system, an iOS system, a Windows system, or other.

The processor 500 may be configured to invoke the computer-executable program codes to perform following operations: detecting a first touch operation performed on an icon of a message application; obtaining at least one touch parameter of the first touch operation; and displaying at least one first target message when each of the at least one touch parameter of the first touch operation satisfies a corresponding preset condition.

In the implementation, one or more first target messages are displayed when each first touch parameter of the first touch operation satisfies the corresponding preset condition. That is, one or more messages can be directly displayed for viewing when the icon of the message application is touched, which saves time of viewing one or more messages.

In at least one alternative implementation, the at least one touch parameter of the first touch operation may include a touch pressure value, and the corresponding preset condition may include that the touch pressure value is greater than a first preset threshold.

In at least one alternative implementation, the at least one touch parameter of the first touch operation may include a touch pressure value, and a touch duration, and the corresponding preset condition may include that the touch pressure value is greater than the first preset threshold and the touch duration is greater than a preset duration.

In at least one alternative implementation, the at least one touch parameter of the first touch operation may include a touch pressure value, and a fingerprint information, and the corresponding preset condition may include that the touch pressure value is greater than the first preset threshold and the fingerprint information matches with preset fingerprint information.

In at least one alternative implementation, the at least one touch parameter of the first touch operation may include a touch pressure value, a touch duration, and a fingerprint information, and the corresponding preset condition may include that the touch pressure value is greater than the first preset threshold, the touch duration is greater than the preset duration, and the fingerprint information matches with the preset fingerprint information.

In at least one alternative implementation, the processor 500 may be further configured to invoke the computer-executable program codes to perform following operations: detecting a second touch operation after displaying the at least one first target message; obtaining at least one touch parameter of the second touch operation; determining, based on a corresponding relationship between the at least one touch parameter of the second touch operation and at least one second target message, at least one second target message corresponding to the second touch operation; and switching to display the at least one second target message corresponding to the second touch operation.

In at least one alternative implementation, the processor 500 may be further configured to invoke the computer-executable program codes to perform following operations: detecting a third touch operation after displaying the at least one first target message; obtaining at least one touch parameter of the third touch operation; determining, based on a corresponding relationship between the at least one touch parameter of the third touch operation and at least one display mode each for displaying at least one message, a display mode corresponding to the third touch operation; and displaying the at least one first target message in the determined display mode.

In one or more other implementations, the processor 500 may be configured to invoke the computer-executable program codes to perform following operations: detecting a touch operation performed on an icon of the message application; obtaining at least one touch parameter of the touch operation; determining, based on a corresponding relationship between the at least touch parameter of the touch operation and at least one display mode each for displaying at least one message, a display mode corresponding to the touch operation, when each of the at least touch parameter of the touch operation satisfies a corresponding preset condition; and displaying at least one target message in the determined display mode.

At least one message previewing window may be outputted to display the at least one target message. The determined display mode may include a scaling factor of each of the at least one message previewing window, and a scaling factor of content of each of the at least one target message, and may include an arrangement manner of the at least one message previewing window, and also may include an arrangement manner of the at least one target message in the at least one message previewing window.

In the one or more other implementations, when each touch parameter of the first touch operation satisfies its corresponding preset condition, a display mode for displaying at least one message is determined, and then one or more first target messages are displayed in the determined display mode. Therefore, it is convenient for a user to view one or more messages in a suitable manner by performing a touch operation on the icon of the message application.

According to actual needs, sequences of operations in the method implementations of the present disclosure may be adjusted, some operations may be combined, and some operations may be deleted.

According to actual needs, some units of the terminal of the present disclosure may be combined, divided, or deleted.

It will be understood by those of ordinary skill in the art that all or a part of the various methods of the implementations described above may be accomplished by means of a program to instruct associated hardware, the program may be stored in a computer-readable memory, which may include a flash memory, a read-only memory (ROM), a random-access memory (RAM), Disk or CD, and so on.

The foregoing has described in detail a method for viewing a message and a terminal disclosed in the implementations of the present disclosure. The principles and implementation of the present disclosure are described herein through specific examples. The description about the implementations of the present disclosure is merely provided to help to understand the method and core ideas of the present disclosure. In addition, a person of ordinary skill in the art can make variations and modifications to the present disclosure in terms of the specific implementations and application scopes according to the ideas of the present disclosure. Therefore, the content of specification shall not be construed as a limitation of the present disclosure.

What is claimed is:

1. A method for viewing a message, comprising:
   determining that a first touch operation is performed on an icon of a message application in a user terminal when duration of a touch input performed on the icon of the message application exceeds a preset duration;
   obtaining at least one touch parameter of the first touch operation;
   displaying at least one target message when each of the at least one touch parameter of the first touch operation satisfies a corresponding preset condition;
   determining whether the duration of the touch input performed on the icon of the message application is increased after displaying the at least one target message;
   determining that a second touch operation is performed on the icon of the message application based on a determination that the duration of the touch input performed on the icon of the message application is increased; and
   displaying the at least one target message in a preset display mode.

2. The method of claim 1, wherein the at least one touch parameter of the first touch operation comprises a touch pressure value and a fingerprint information, and the corresponding preset condition comprises that the touch pressure value exceeds a preset pressure value and the fingerprint information matches with a preset fingerprint information.

3. The method of claim 1,
   wherein displaying the at least one target message in the preset display mode comprises:
   adjusting a size of at least one message previewing window in which the at least one target message is displayed to be a preset size.

4. The method of claim 2, wherein displaying the at least one target message in the preset display mode comprises:
   adjusting a size of at least one message previewing window in which the at least one target message is displayed to be a preset size.

5. The method of claim 1, wherein displaying the at least one target message in the preset display mode comprises:
   scaling content contained in the at least one target message according to a target ratio, wherein the target ratio is a ratio of a preset size of at least one message previewing window after adjustment to a size of the at least one message previewing window before adjustment, wherein the at least one target message is displayed in the at least one message previewing window.

6. The method of claim 2, wherein displaying the at least one target message in the preset display mode comprises:
   scaling content contained in the at least one target message according to a target ratio, wherein the target ratio is a ratio of a preset size of at least one message previewing window after adjustment to a size of the at least one message previewing window before adjustment, wherein the at least one target message is displayed in the at least one message previewing window.

7. A user terminal, comprising:
   at least one processor; and
   a computer readable memory, coupled to the at least one processor and storing at least one computer executable instruction therein, which when executed by the at least one processor, cause the at least one processor to carry out actions, comprising:
   determining that a first touch operation is performed on an icon of a message application in a user terminal when duration of a touch input performed on the icon of the message application exceeds a preset duration;
   obtaining at least one touch parameter of the first touch operation;
   displaying at least one target message when each of the at least one touch parameter of the first touch operation satisfies a corresponding preset condition;
   determining whether the duration of the touch input performed on the icon of the message application is increased after displaying the at least one target message;
   determining that a second touch operation is performed on the icon of the message application based on a determination that the duration of the touch input performed on the icon of the message application is increased; and
   displaying the at least one target message in a preset display mode.

8. The user terminal of claim 7, wherein the at least one touch parameter of the first touch operation comprises a touch pressure value and a fingerprint information, and the corresponding preset condition comprises that the touch pressure value exceeds a preset pressure value and the fingerprint information matches with a preset fingerprint information.

9. The user terminal of claim 7, wherein the processor configured to invoke the computer-executable program codes to perform displaying the at least one target message in the preset display mode is configured to perform an action, comprising:
   adjusting a size of at least one message previewing window in which the at least one target message is displayed to be a preset size.

10. The user terminal of claim 8, wherein the processor configured to invoke the computer-executable program codes to perform displaying the at least one target message in the preset display mode is configured to perform an action, comprising:
    adjusting a size of at least one message previewing window in which the at least one target message is displayed to be a preset size.

11. The user terminal of claim 9, wherein the processor configured to invoke the computer-executable program codes to perform displaying the at least one target message in the preset display mode is configured to perform an action, comprising:
    scaling content contained in the at least one target message according to a target ratio, wherein the target ratio is a ratio of a preset size of at least one message previewing window after adjustment to a size of the at least one message previewing window before adjustment, wherein the at least one target message is displayed in the at least one message previewing window.

12. The user terminal of claim 10, wherein the processor configured to invoke the computer-executable program codes to perform displaying the at least one target message in the preset display mode is configured to perform an action, comprising:

scaling content contained in the at least one target message according to a target ratio, wherein the target ratio is a ratio of a preset size of at least one message previewing window after adjustment to a size of the at least one message previewing window before adjustment, wherein the at least one target message is displayed in the at least one message previewing window.

13. A user terminal, comprising:

at least one processor; and a computer readable memory, coupled to the at least one processor and storing at least one computer executable instruction therein, which when executed by the at least one processor, cause the at least one processor to carry out actions, comprising:

displaying at least one target message in response to detecting that an icon of a message application is touched;

determining whether the icon of the message application is released upon displaying the at least one first target message; and displaying the at least one target message in a preset display mode in response to determining that the icon of the message application is unreleased.

14. The user terminal of claim 13, wherein the processor configured to invoke the computer-executable program codes to perform displaying the at least one target message in the preset display mode is configured to perform an action, comprising:

adjusting a size of at least one message previewing window in which the at least one target message is displayed to be a preset size.

15. The user terminal of claim 13, wherein the processor configured to invoke the computer-executable program codes to perform displaying the at least one target message in the preset display mode is configured to perform an action, comprising:

scaling content contained in the at least one target message according to a target ratio, wherein the target ratio is a ratio of a preset size of at least one message previewing window after adjustment to a size of the at least one message previewing window before adjustment, wherein the at least one target message is displayed in the at least one message previewing window.

16. The terminal of claim 13, wherein the processor configured to invoke the computer-executable program codes to perform displaying the at least one target message in the preset display mode is configured to perform an action, comprising:

outputting at least one message previewing window to display the at least one target message.

17. The terminal of claim 16, wherein the preset display mode comprises a scaling factor of each of the at least one message previewing window, and a scaling factor of content of each of the at least one target message.

18. The terminal of claim 16, wherein the preset display mode comprises an arrangement manner of the at least one message previewing window.

19. The terminal of claim 16, wherein the preset display mode comprises an arrangement manner of the at least one target message in the at least one message previewing window.

20. The terminal of claim 13, wherein the at least one target message is received within a preset period.

* * * * *